INFORMATION RECORDING SYSTEM UTILIZING A PLURALITY OF DELAY PULSE NETWORKS

Filed Aug. 23, 1962

INVENTOR.
HENRY VON KOHORN
BY Milton H. Gross
ATTORNEY

Nov. 15, 1966 H. VON KOHORN 3,286,273

INFORMATION RECORDING SYSTEM UTILIZING A PLURALITY OF DELAY PULSE NETWORKS

Filed Aug. 23, 1962

INVENTOR.
HENRY VON KOHORN

BY Milton H. Gross

ATTORNEY 3,286,273

INFORMATION RECORDING SYSTEM UTILIZING A PLURALITY OF DELAY PULSE NETWORKS

Henry Von Kohorn, Pecksland Road, Greenwich, Conn.

Filed Aug. 23, 1962, Ser. No. 218,947
9 Claims. (Cl. 346—74)

The present invention relates generally to improvements in the handling of information and it relates more particularly to an improved apparatus for the recording of information.

It is frequently desirable in the monitoring of information to record the information after the event. Such information may be of any type, for example, audible, visual, or various measurements such as pressure, temperature, humidity, electric and magnetic fields, different types of radiation and the like. This information can be transduced into electrical signals which are fed to a magnetic recording head coupled to an advancing magnetic tape on which the information is recorded in the well known manner. With conventional equipment, it is necessary to continuously record the incoming information in order to avoid missing any of the required information. This practice under many conditions is highly impractical, for example in the telemetering and transmission of information gathered by missiles and satellites the ambient conditions may be such that the resolution of the signals received from the satellite is insufficient to properly read the transmitted information. In these circumstances, it is desirable to record the information at the point of gathering but such circumstances are not determined until after the event. A missile in space may, for hours or for days, have nothing of value to record and if the missile itself continuously recorded valueless information, a very substantial amount of tape and energy would be wasted, quite apart from the tedious subsequent editing work.

An apparatus for permanently recording information after the event is described in U.S. Patent No. 3,028,454 granted April 3, 1962 to Henry Von Kohorn. While the apparatus described in the aforesaid patent is highly suitable for its intended purpose, it possesses certain limitations when employed at remotely located stations such as in missiles or satellites. It lacks the broad versatility and dependability required of such installations and is not easily adaptable to remote control. Moreover, the weight, bulk, and power requirements are greater than can be tolerated in these applications.

It is, therefore, a principal object of the present invention to provide an improved apparatus for the recording of information.

Another object of the present invention is to provide an improved apparatus for the recording of information after the event.

Still another object of the present invention is to provide an improved remotely controlled information recording apparatus.

A further object of the present invention is to provide an information recording apparatus of the above nature characterized by its simplicity, ruggedness, reliability and low weight and bulk.

The above and other objects of the present invention will become apparent from a reading of the following description taken in conjunction with the accompanying drawing, wherein.

Figure 1:
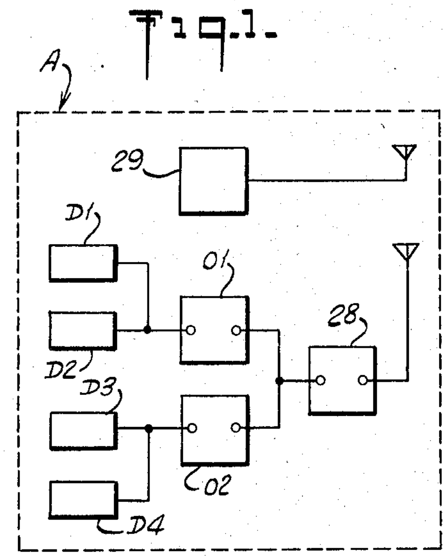
FIGURE 1 is a block diagram of a monitoring station forming part of the improved apparatus.
Figure 2:
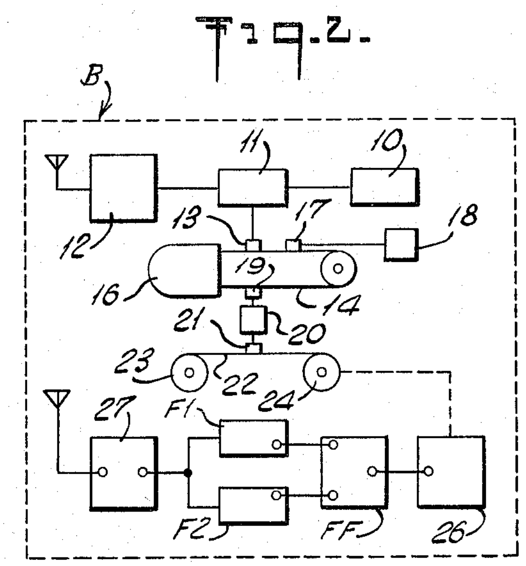
FIGURE 2 is a block diagram and schematic view of the remotely controlled recording station thereof.

Referring now to the drawings and more particularly to FIGURES 1 to 4 thereof which illustrate a preferred embodiment of the present invention, the reference letter A generally designates a local monitoring station and B a remotely located observation station such as a satellite, missile or the like. Positioned in the remote station B is a signal generating or transducing and translating network 10 which may respond to any desired information and produce corresponding signals. Such information may be picture signals, sound signals, signals representing various measurements, such as temperatures, pressures, humidity, gravitation, radiation, accelerations, magnetic and electric fields, etc. The output of the signal generator 10 is amplified by the amplifier 11 the output of which in turn modulates a transmitter 12 and a magnetic recording head or assembly 13. The recording head 13 is coupled to an endless recording tape 14 provided with a storage chamber 16 and continuously driven in any suitable manner so that the time of traverse of the full length of the tape 14 is a substantially constant predetermined interval. Coupled to the tape 14 immediately preceding the recording head 13 is an erasing head 17 energized by a suitable oscillator 18. In addition, a magnetic pickup head 19 is coupled to the tape 14 shortly trailing the erasing head 17 so that the information recorded on the tape 14 by the head 13 is picked up by the head 19 the predetermined time interval following said recording thereof, said interval being as desired, for example about two to five minutes.

The pickup head 19 is connected through an amplifier 20 to a second recording head 21 which is coupled to a permanent magnetic recording tape carried on and advanced between feed and take-up reels 23 and 24 respectively. The tape 22 is selectively advanced and stopped in any well known manner by a drive system 26 which responds to the value or sign of an input signal. The recording and drive apparatus may be of the type described in the above-identified Von Kohorn patent.

In order to remotely control the advance of the tape 22, there is provided a radio frequency receiver and detector 27 the output of which is connected through narrow band pass filter networks F1 and F2 tuned to different frequencies, respectively to the set or close and reset or open input terminals of a switch defining bistable flip flop of multivibrator network FF. The output of the switch FF is connected to the tape advance control 26 and is so sensed that when the reset terminal is pulsed the flip flop circuit FF is switched to actuate the control network 26 to stop the advance of the tape 22.

Located at the local station A is a transmitter 28 which radiates a signal tuned to the receiver 27 and is alternatively selectively momentarily modulated by an oscillator O1 or O2 which generates a signal of the frequency pass of filters F1 and F2 respectively. The oscillator O1 is momentarily actuated in response to a signal from one of a plurality of delayed pulse generating networks D1, D2 and the oscillator O2 is momentarily actuated in response to a signal from one of a plurality of delayed pulse generating networks D3 and D4, the outputs of pulse generators D1 and D2 being connected to the control terminal of oscillator O1 and the outputs of pulse generators D2 and D3 being connected to the control terminal of oscillator O2. Each of the pulse generators D1–D4 is provided with an actuating button or switch and generates a pulse a predetermined delay time interval following the closing of the switch or the pulsing of the circuit input terminal. The delay time interval of the pulse generators D1, D3 are respectively equal to the time interval of travel of the tape 14 from the recording head 13 to the pickup head 19 whereas the delay time interval of the other pulse generators D2 and D4 are shorter by selected increments than that of the generators D1 and D3. It should be noted that more than two pairs of pulse generators D may be provided and each, if desired, be individually adjustable as to delay time.

Figure 3:
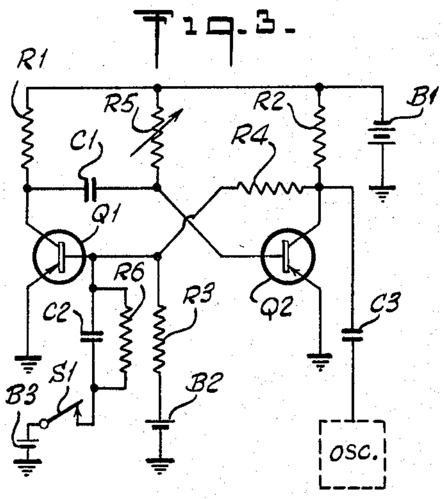
FIGURE 3 is a circuit diagram of a network forming part of the present apparatus.

In FIGURE 3 of the drawing, there is illustrated a delay pulse generator which may be employed for each of the networks D1–D4 and is in the form of a monostable flip flop circuit network. The generator includes a pair of transistors Q1 and Q2 the emitters of which are grounded and the collectors of which are connected respectively through resistors R1 and R2 to the negative terminal of a battery B1 the positive terminal of which is grounded. The base of transistor Q1 is connected through a resistor R4 to the collector of transistor Q2. The base of transistor Q2 is connected through a capacitor C1 to the collector of transistor Q1 and through a rheostat R5 to the negative terminal of battery B1.

The triggering pulse to the pulse generator is applied to the base of transistor Q1 and is produced by connecting the base through capacitor C2 shunted by a resistor R6 and connected through a normally open switch S1 to the negative terminal of a battery B3 whose positive terminal is grounded. The output of the pulse generator is taken from the collector of transistor Q2 by way of a capacitor C3 which is connected to the input of respective oscillator O1, O2. Upon the momentary closing of the switch S1, a pulse is applied to the base of transistor Q1 which generates a square negative pulse at the collector of transistor Q2 of a duration determined by the time constant of capacitor C1 rheostat R5 and may be varied by adjusting the rheostat. Upon the termination of the square wave there is a rapid rise of voltage which is transmitted to a respective oscillator to momentarily actuate the same.

Figure 4:
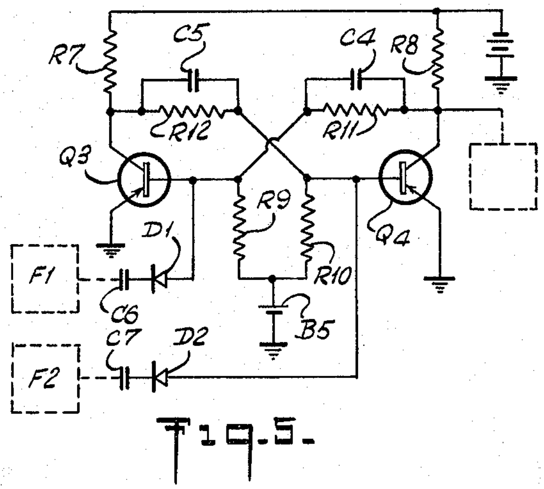
FIGURE 4 is a circuit diagram of another network forming part of the present apparatus.

As seen in FIGURE 4, the switch FF may be a bistable multivibrator including transistors Q3 and Q4 the emitters of which are grounded and the collectors of which are connected through resistors R7 and R8 respectively to one terminal of a battery B4 the other terminal of which is grounded. The bases of the transistors Q3 and Q4 are connected respectively through resistors R9 and R10 to one terminal of a bias battery B5 the other terminal of which is grounded. In addition, the base of transistor Q3 is connected through a resistor R11 shunted by a capacitor C4 to the collector of transistor Q4 and the base of the transistor Q4 is connected through a resistor R12 shunted by a capacitor Q5 to the collector of the transistor Q3. The set pulse is applied to the base of the transistor Q3 through series connected capacitor C6 and diode D1 whose cathode is connected to the transistor base and the reset pulse is applied to the base of transistor Q4 through series connected capacitor C7 and diode D2 whose cathode is connected to said transistor base. In the alternative, both pulses may be applied to the base of one of the transistors by connecting the output of the filters to the base through respectively oppositely oriented diodes. The output of the switch circuit is taken from the collector of transistor Q4.

In the operation of the apparatus described above, the amplified signal of the generator 10 is continuously recorded on the tape 14 and transmitted to a receiver 29 located at the station A1. In the event that an operator at station A wishes a permanent recording to be made at station B in view of the poor reception at station A or for other reasons, he pulses a selected of the generators D1 or D2, depending upon the elapsed time to the monitored information he wishes to record. After a predetermined time interval inherent in the respective generator D1, D2 a pulse therefrom momentarily actuates the oscillator O1 to modulate the transmitter 28. The modulated transmitted signal is amplified and detected by the receiver 27 and passed by the filter F1 to set the switch FF and actuate the control device 26 to advance the tape 22. The information stored on the tape 14 is thus transferred to the tape 22. The information recorded on the tape 22 is that beginning at a time interval before the triggering of the pulse generator D1 which is equal to the storage or cycle time of tape 14 less the delay time of the actuated generator D1, D2 and the transmission time which latter is generally insignificant. Thus, if the time of travel of the tape 14 from the head 13 to the head 19 is two minutes and the interval of delay of the actuated pulse generator D1, D2 is 1.5 minutes the information recorded on tape 22 is that which occurred 0.5 minute before the actuation of the respective pulse generator D1, D2. Of course, the after the event recording time may be varied by correspondingly inversely varying the delay time of the delay pulse generator. The advance of the tape 22 may be stopped in a like manner, after the event, by triggering a pulse generator D3, D4 which momentarily actuates the oscillator O2 a predetermined time thereafter to correspondingly modulate the transmitter 28. The modulated signal is received and detected by the receiver, passed through the matching filter F2 to pulse and reset the switch FF and stop the advance of the tape 22.

Figure 5:
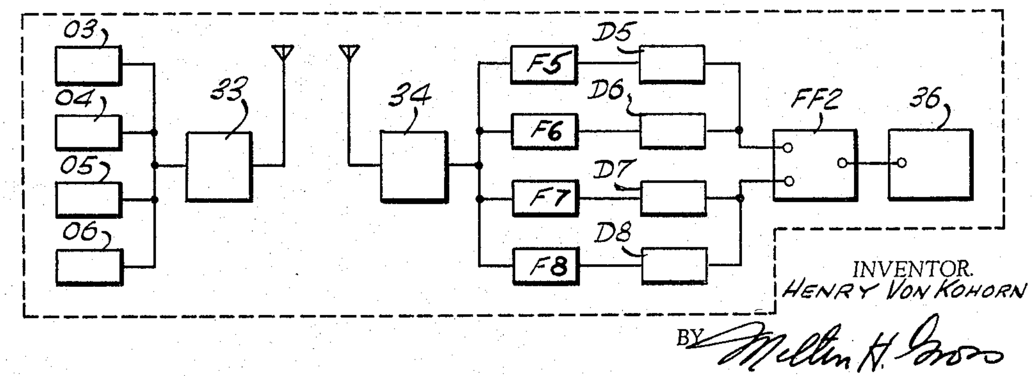
FIGURE 5 is a block diagram of another embodiment of the present invention.
Figure 1:
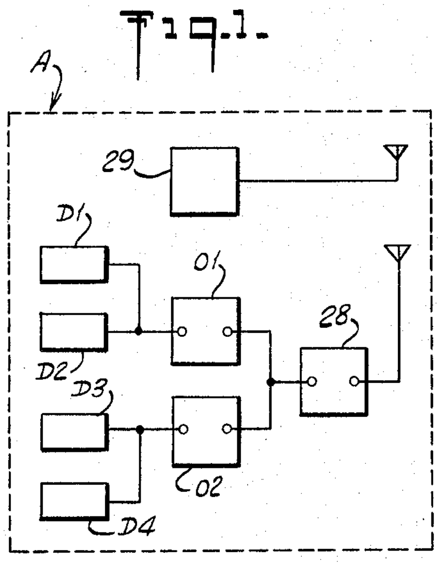
Figure 2:
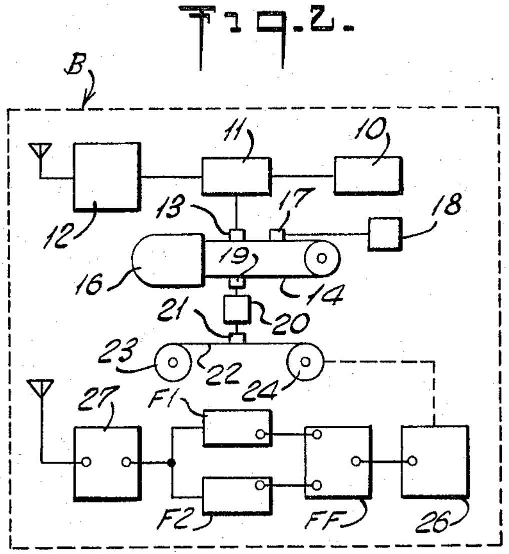
Figure 3:
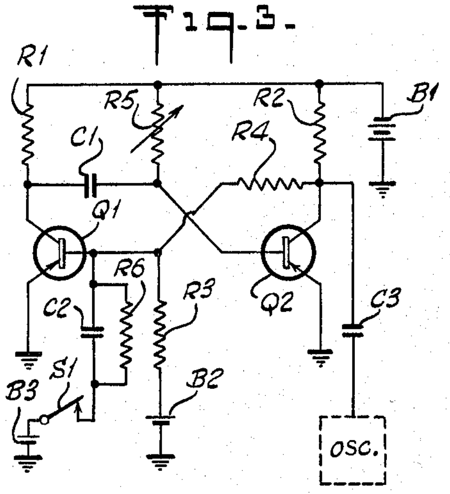
Figure 4:
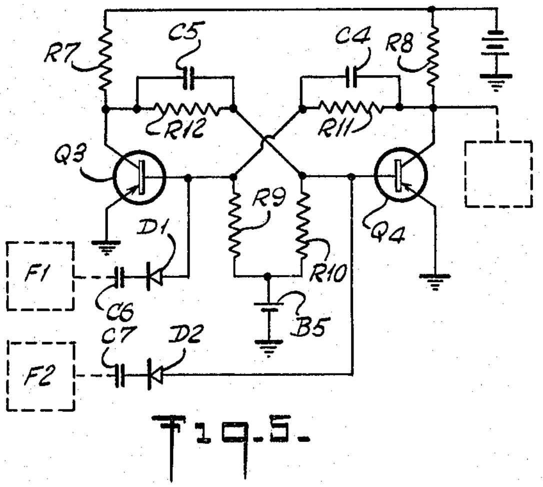
Figure 5:
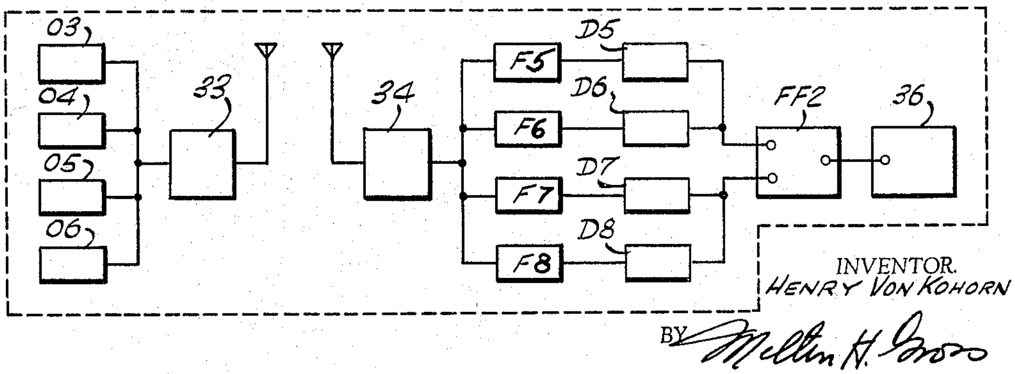

The embodiment of the present invention illustrated in FIGURE 5 of the drawing differs from that above described only in that the delay networks are located at the remote station and the transmitter sends variously modulated signals depending on the desired delay. Specifically, the monitor station includes a transmitter 33 which is selectively modulated by oscillators O3, O4, O5 and O6. At the remote station, a receiver 34 detects the transmitted signal and couples it to delay pulse generators D5, D6, D7 and D8 through respective filters F5, F6, F7 and F8 matching the oscillators O3 to O6 respectively. The outputs of pulse generators D5 and D6 are connected to the set terminal of the bistable multivibrator FF2 and those of generators D7 and D8 are connected to the reset terminal thereof. The output of the switch FF2 is connected to the tape advance control 36. The operation of the last described apparatus is similar to that first described. The tape advance is actuated a predetermined time interval following the actuation of a selected oscillator O3, O4 and stopped a predetermined time interval following the actuation of a selected oscillator O5, O6.

While there have been described and illustrated preferred embodiments of the present invention, it is apparent that numerous alterations, additions and omissions may be made without departing from the spirit thereof.

I claim:

1. An information storage and communications system comprising an information generator, a first transmitter having an input connected to said information signal generator, an intermittetly advanceable permanent information recording means, control means alternatively advancing and stopping said recording means, a continuously advancing information storage device adapted to store information for a predetermined time interval and having an input coupled to said information signal generator and an output connected to said information recording means, and a network actuating said control means, and including a receiver associated with said control means and a selectively actuatable second transmitter remote from and tuned to said receiver and a first delay pulse network connected in said actuating network and having a delay interval not exceeding that of said temporary storage device whereby actuation of said network correspondingly actuates said control means said delay interval following said actuation and a second delay pulse network connected in said actuating network and having a second delay interval whereby actuation of said second delay pulse network deactuates said control means said second delay interval following said actuation of said second delay pulse network.

2. The system of said first claim 1 including a plurality of delay pulse networks connected in said network and having different delay intervals and being selectively actuatable.

3. The system of claim 1 wherein said first delay interval is adjustable.

4. An information recording system comprising a temporary information storage device having an input and an output and means transmitting information from said input to said output at a predetermined time interval, a permanent information recording means having an input connected to said output of said temporary storage device, a first manipulative means selectively actuating said permanent storage device a predetermined time interval following manipulation thereof; and a second manipulative means selectively deactuating said permanent storage device a predetermined time interval following the manipulation thereof.

5. An improved recording device comprising a driven endless first recording band, a signal energizable first recording head coupled to said first band, a pickup head coupled to said first band a predetermined interval following said first recording head, a second recording band, a second recording head coupled to said second recording band and connected to said pickup head, means for driving said second recording band, a bistable flip flop circuit having an output alternatively actuating and deactuating said drive means and an input alternately responsive to a set and a reset signal, and first and second selectively operable time delay pulse generating networks having outputs connected to said flip flop circuit input to alternately set and reset said flip flop circuit.

6. The recording device of claim 5 including a plurality of said first and said second pulse generating networks having varying time delay.

7. The recording device of claim 5 wherein said pulse generating delay times are adjustable.

8. The recording device of claim 5 including radio frequencies coupling means connecting said pulse generators and said flip flop network.

9. The recording device of claim 5 wherein said pulse generators comprise monostable multivibrations.

References Cited by the Examiner

UNITED STATES PATENTS

| | | | |
|---|---|---|---|
| 2,720,618 | 10/1955 | Hanson | 318—16 |
| 3,028,454 | 4/1962 | Kohorn | 179—100.2 |

TERRELL W. FEARS, *Acting Primary Examiner.*

BERNARD KONICK, *Examiner.*

V. P. CANNEY, *Assistant Examiner.*